US007517124B2

(12) United States Patent
Josquin et al.

(10) Patent No.: US 7,517,124 B2
(45) Date of Patent: Apr. 14, 2009

(54) SYSTEM FOR FIXING A LAMP TO A HEADLIGHT LAMP HOLDER FOR AN AUTOMOBILE

(75) Inventors: Daniel Josquin, Bobigny Cedex (FR); Jean Masse, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/326,721

(22) Filed: Jan. 6, 2006

(65) Prior Publication Data

US 2006/0152940 A1 Jul. 13, 2006

(30) Foreign Application Priority Data

Jan. 7, 2005 (FR) .................................. 05 00197

(51) Int. Cl.
*F21V 7/04* (2006.01)
*F21V 15/01* (2006.01)
*B60Q 1/00* (2006.01)
*B60Q 1/26* (2006.01)

(52) U.S. Cl. ....................... 362/549; 362/487; 362/546; 362/548

(58) Field of Classification Search ......... 362/459–549; 439/34–36, 177, 214, 226–244, 296, 299–304, 439/345, 346, 439–371
See application file for complete search history.

(56) References Cited

U.S. PATENT DOCUMENTS 4,819,133 A 4/1989 Kochi et al. ................... 362/61
4,851,976 A * 7/1989 McMahan et al. ........... 362/548
5,613,762 A * 3/1997 Agabekov ................... 362/240
5,709,450 A * 1/1998 Francis et al. ............... 362/546
5,945,776 A 8/1999 Koster et al. ................ 313/113
6,176,604 B1 1/2001 Dubrovin et al. ............ 362/539
6,568,043 B1 * 5/2003 Detable et al. .............. 24/20 R
6,644,842 B2 * 11/2003 Yamaguchi ................. 362/547
2005/0111230 A1 5/2005 Tronquet et al. ............ 362/519
2005/0281045 A1 * 12/2005 Yang .......................... 362/549

FOREIGN PATENT DOCUMENTS

| | | |
|---|---|---|
| DE | 10132853 | 2/2002 |
| EP | 1 533 563 | 5/2005 |
| FR | 2742709 | 6/1997 |
| FR | 2769072 | 4/1999 |
| WO | WO98/11589 | 3/1998 |

OTHER PUBLICATIONS

Dialog English Abstract for EP 1 533 563.
Dialog English Abstract for FR 2 742 709.
Dialog English Absract for FR 2 769 072.
Dialog English Abstract for DE 101 32 853.

* cited by examiner

*Primary Examiner*—Sandra L O'Shea
*Assistant Examiner*—William J Carter

(57) ABSTRACT

A lighting and/or signaling device for an automobile comprising a xenon lamp and a mating part comprising a reflector and a lamp holder providing the holding of a bulb of the discharge lamp in front of the reflector. A system for fixing the xenon lamp on the mating part comprising a rigid ring able to be mounted, so as to be able to move in rotation, about the lamp holder and a flexible annulus mounted inside the rigid ring and fixed to the lamp holder so as to be non-removable.

14 Claims, 4 Drawing Sheets

SYSTEM FOR FIXING A LAMP TO A HEADLIGHT LAMP HOLDER FOR AN AUTOMOBILE

FIELD OF THE INVENTION

The invention concerns a system for fixing a lamp of the discharge-lamp type, also referred to as a xenon lamp, on a lamp holder of a lighting and/or signaling device, of the headlight type, for an automobile. The invention finds applications in the automobile field, and more precisely in the field of automobile lighting. Its aim is in particular to develop a rapid fixing for a discharge lamp with the possibility of interchangeability between various models of discharge lamp.

STATE OF THE ART

Currently, lighting devices are provided with light sources which can be of various kinds. In particular, vehicle headlights can be equipped with several light sources, which may be of two different kinds, for example: a halogen lamp and a discharge lamp. In the case of a discharge lamp, the light source is equipped with a high-voltage module which provides the electrical supply to the bulb of the discharge.

Amongst discharge lamps, there exist several models of lamp, the main ones of which are the so-called D1 lamp and the so-called D2 lamp. Each of these lamps comprises a discharge bulb, a bulb base and a high-voltage module. The high-voltage module is fixed irremovably, in the case of a D1 lamp, and on the contrary removably in the case of a D2 lamp.

In the case of a D1 lamp, the high-voltage module forms an integral part of the lamp. More precisely, the discharge bulb is surmounted by a high-voltage module, fixed to the said bulb. This module usually has a generally substantially square external contour, with a relatively small size compared with a D2 lamp and its module, which will be described subsequently. Changing this bulb and high-voltage module assembly is relatively tricky because firstly of the difficulty of access to the D1 lamp and the operations to be performed for removing the faulty assembly and installing the new assembly and secondly because of the risks due to the high voltage present in the module.

In the case of a D2 lamp, the high-voltage module is not integrated in the lamp; it constitutes an independent part, mounted removably on the lamp; it is fixed to the bulb after the bulb is fitted in the reflector. It is therefore possible, when the headlamp is assembled and dismantled, to disconnect the high-voltage module from the bulb. This has a certain advantage compared with the D1 lamp. This is because, with a D2 lamp, it is possible, when the bulb is faulty, to change only the bulb and to keep the initial high-voltage module. However, changing a bulb in a D2 lamp is even more tricky than changing the bulb and module assembly for a D1 lamp. This is because, in a headlamp, which is difficult of access, the user must first of all remove the module and remove the bulb; he must then change the bulb and replace the module on the bulb, with all the risks inherent in the high voltage in the module.

As will be understood from a reading of the above, the geometry and size of the lamps D1 and D2 are different. Different fixing systems are therefore necessary to fix a D1 lamp and a D2 lamp to a reflector lamp holder. The D1 and D2 lamps are therefore not interchangeable in the same headlight. To allow interchangeability of these lamps, there exist removable fixing rings fixed to the reflectors of the headlights by screw systems. These screw systems require a series of rotation movements on the part of the user. However, as explained before, the environment of a lamp and a reflector is relatively small, which makes these rotation movements difficult and tiring for the user to perform.

Moreover, the screw systems are by nature removable. However, a vehicle in operation vibrates. The vibrations of this vehicle can give rise to a progressive unscrewing of the ring and consequently undesirable dismantling of the lamp. Thus, in order to ensure that the fixing system is held in position on the reflector, some fixing systems are equipped with a locking means. This locking means may for example be a spring system of the spring blade type which provides an abutment on the high-voltage module of the lamp, preventing any unexpected dismantling. Such a system is described in the patent EP 1 065 438. However, the closure of such a spring blade system requires an additional movement on the part of the user, which complicates further the bulb changing by the user. In addition, the actuation of such a spring blade gives rise to a relatively high movement, inappropriate for a small environment such as that of a headlight.

DISCLOSURE OF THE INVENTION

The aim of the invention is precisely to resolve the drawbacks of the techniques disclosed above by providing an improved fixing system for a D1 lamp and D2 lamp and which will in particular not dismantle and/or is more simple to implement. This fixing system makes it possible to hold and lock the discharge bulb with the lamp holder. For this purpose, the invention uses the assembly of a non-removable flexible annulus on the lamp holder of the headlight and a rigid ring able to move with respect to the flexible annulus.

More precisely, the invention concerns a lighting and/or signaling device, of the headlight type, for an automobile, comprising:

- a discharge lamp, also referred to as a xenon lamp,
- an mating part comprising a reflector and a lamp holder providing the holding of a bulb of the discharge lamp in front of the reflector,
- a system for fixing the xenon lamp to the mating part.

This device uses a fixing system comprising:

- a rigid ring able to be mounted, so as to move in rotation, about the lamp holder,
- a flexible annulus mounted inside the rigid ring and fixed to the lamp holder so as to be non-removable.

Advantageously, the fixing system of the invention also comprises means able to provide electrical continuity between the conductive casing of the xenon lamp enclosing the high-voltage module and a conductive zone of the mating part mentioned above. This electrical continuity is very useful for combating electromagnetic interference created by the functioning of the xenon lamp. In this way an electromagnetic shielding is thus obtained, the electrical continuity of the conductive casing of the high-voltage module of the lamp as far as the ballast, itself also generally disposed in a conductive casing, being provided further “upstream”: electrical continuity between the two casings can be achieved by the shielded supply cable (for example by means of a conductive sheath). The invention thus simultaneously provides the mechanical mounting of the lamp and contributes to the electromagnetic shielding thereof.

The invention can also comprise one or more of the following characteristics:

- the flexible annulus comprises at least two fixing lugs able to fit in the attachment means of the lamp holder;
- the attachment means of the lamp holder are harpoons intended each to fit in an aperture in a fixing lug of the flexible annulus;

the rigid ring comprises locking lugs able to lock the movement of the ring with respect to the lamp holder;

the lamp holder comprises, on an external surface, a projecting ring guiding the movement of the locking lugs of the rigid ring;

the lamp holder comprises, on an external surface, a projecting ring providing, through its design, the rotational stoppage of the ring about the mounting axis of the said ring;

at least one fixing lug (preferably each lug) comprises a beveled free end, in particular concealed before mounting behind the locking lugs of the rigid ring;

the locking lugs have different sizes and shapes forming a positive location device;

the flexible annulus comprises at least one positioning clip and the rigid ring comprises at least one cavity for receiving a clip;

the rigid ring is mounted around the flexible annulus so that, once the fixing system is mounted on the lamp holder, the fixing lugs of the flexible annulus are no longer accessible;

the flexible annulus comprises fixing claws able to hold the discharge lug in a locked position and the rigid ring comprises, on an internal face, cams able to push the fixing claws and hold them in the locked position;

the flexible annulus comprises contact tongues providing electrical contact between the discharge lamp and the mating part. This is in particular an embodiment of the means able to provide electrical continuity between the lamp (its conductive casing enclosing the high-voltage module, removable or not depending on whether it is a question of a D1 lamp or a D2 lamp) and the mating part at the rear of the reflector;

the flexible annulus is produced by cropping and bending a toughened steel plate;

the flexible annulus comprises, at one end of the cropped plate, a hook and, at another end of the cropped plate, an aperture for receiving the hook.

The invention also concerns an automobile, which comprises at least one lighting and/or signaling device described above.

DETAILED DESCRIPTION OF EMBODIMENTS OF THE INVENTION

Figure 1:
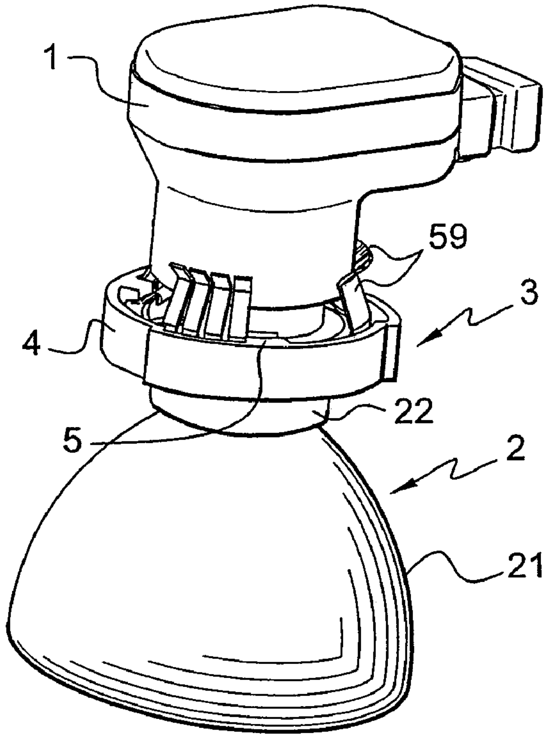
FIG. 1 depicts a fixing system according to the invention mounted around a D2 lamp.

FIG. 1 depicts a fixing system according to the invention mounted around a D2 light source. This figure shows a lamp 1 mounted on a mating part 2 of the headlight by means of a fixing system 3. The mating part 2 is the part of the headlight comprising a reflector 21 and a lamp holder 22. In some embodiments of the headlight, the lamp holder 22 and the reflector 21 form, together, one and the same piece 2. The lamp holder may also not be an integral part of the reflector 21; in this case, it is only fixed to the reflector at the time of assembly of the headlight.

The role of the lamp holder 22, for example cylindrical in shape, is to support the discharge bulb of the lamp 1. It also centers and orients the bulb inside the reflector 21. The fixing system 3 of the invention is mounted around this lamp holder 22.

As can be seen in FIG. 1, the fixing system 3 comprises a rigid ring 4 and a flexible annulus 5 assembled so that the rigid ring is able to move with respect to the flexible annulus. The flexible annulus 5 comprises contact tongues 51 which provide electrical contact with the high-voltage module of the lamp 1.

Figure 2:
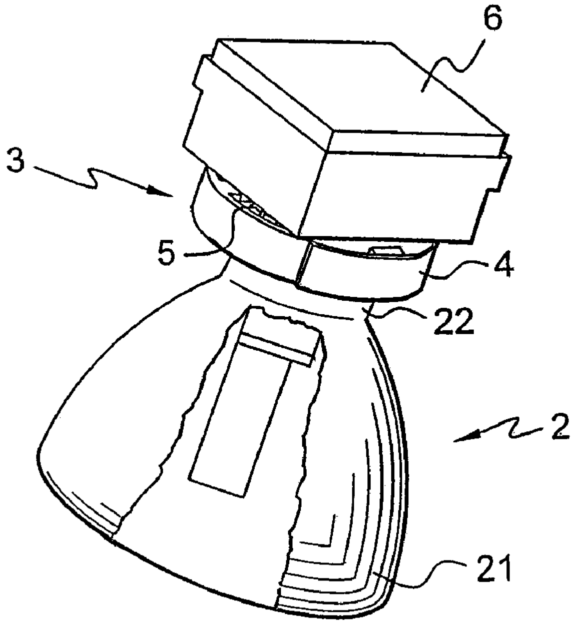
FIG. 2 depicts a fixing system according to the invention mounted around a D1 lamp.

FIG. 2 depicts a fixing system of the invention mounted around a D1 lamp. This FIG. 2 shows the mating part 2 of the headlight, with the reflector 21 and the lamp holder 22, on which the fixing system 3 of the invention and the lamp 6 are mounted. As in the example in FIG. 1, the fixing system 3 comprises a rigid ring 4 and a flexible annulus 5 assembled so that the rigid ring is able to move with respect to the flexible annulus. The flexible annulus 5 comprises contact tongues, not visible in this FIG. 2, which provide electrical contact with the high-voltage module of the lamp 3.

Figure 3A:
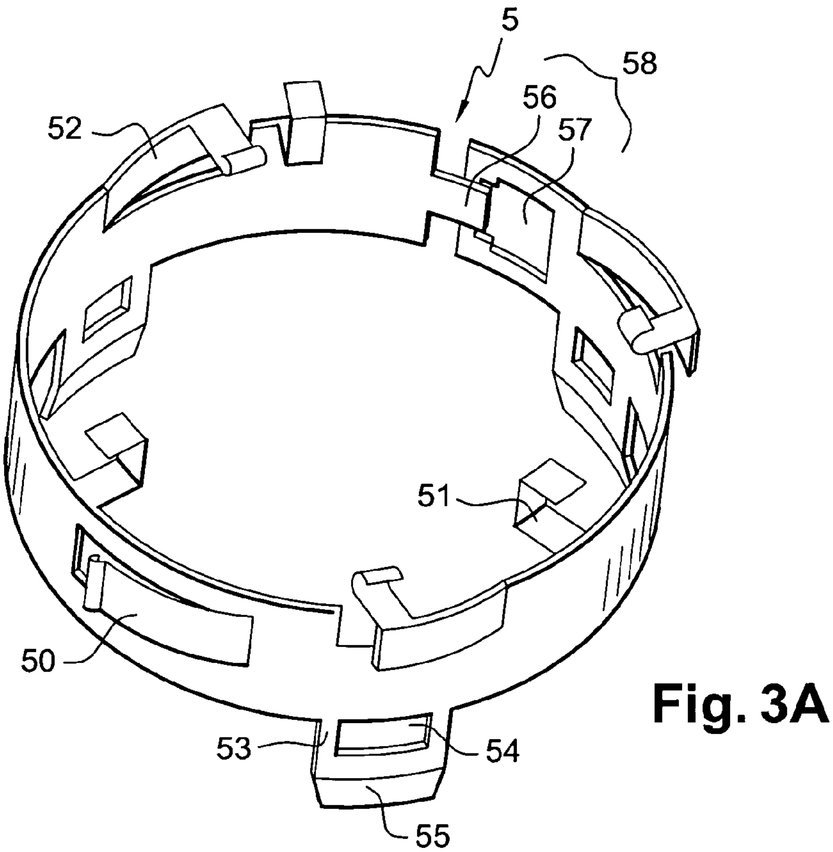
FIGS. 3A and 3B depict examples of flexible annuli of the system of the invention.
Figure 3B:
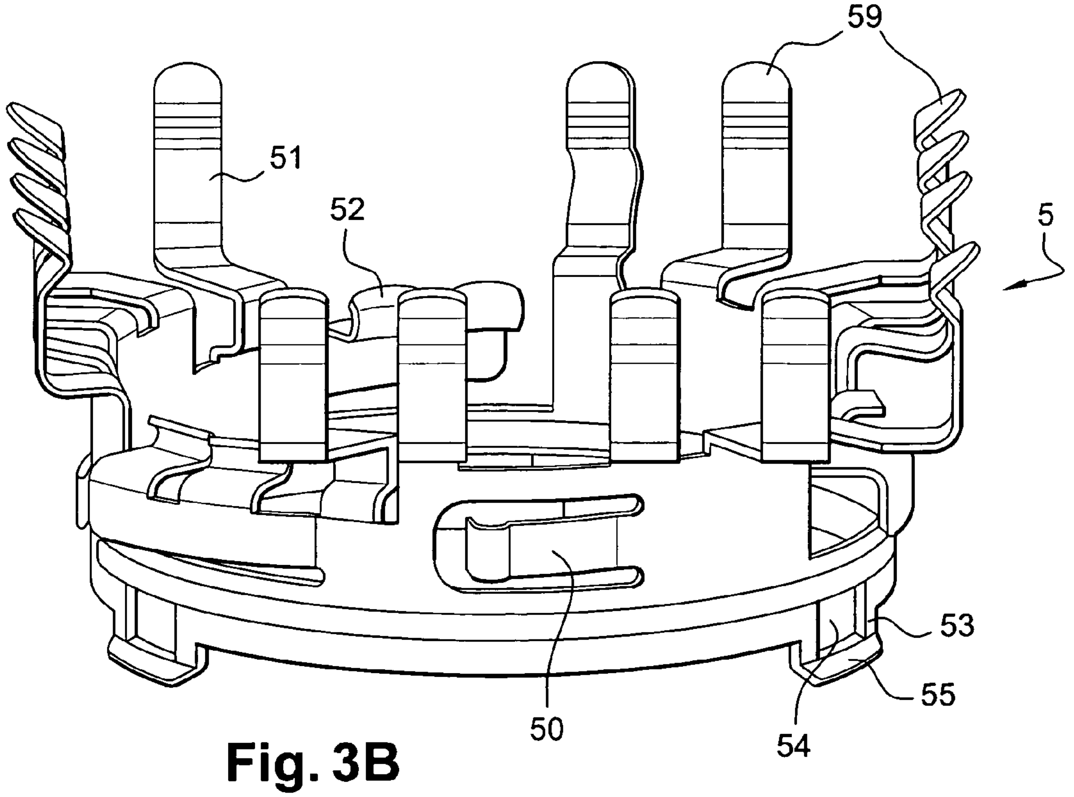
Figure 4:
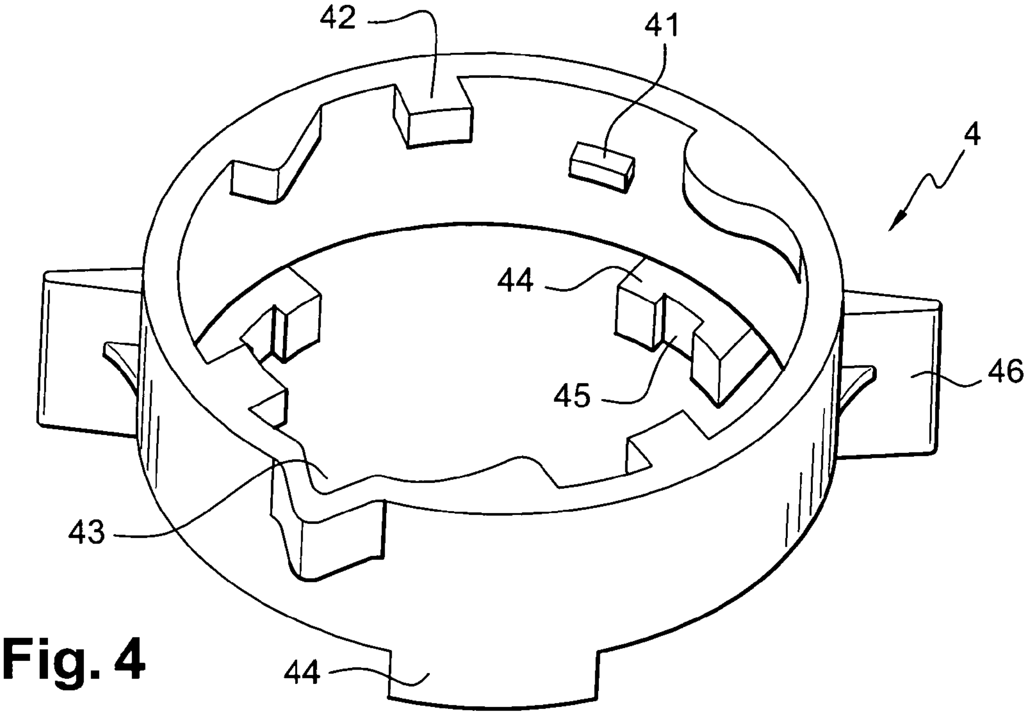
FIG. 4 depicts an example of a rigid ring of the system of the invention.

The fixing system 3 comprises a rigid ring shown in FIG. 4 and a flexible annulus shown in FIGS. 3A and 3B. Whatever the lamp mounted in the headlight, a D1 or a D2 lamp, the rigid ring is identical. On the other hand, the flexible annulus differs according to whether it is a D1 lamp or a D2 lamp. As will be seen subsequently, this difference concerns essentially the contact tongues. The characteristics of the flexible annulus other than the contact tongues are the same for a D1 lamp ring as for a D2 lamp ring.

FIG. 3A depicts an example of a flexible annulus 5 for a D1 lamp. This flexible annulus 5 is electrically conductive. It is produced from a flexible and electrically conductive material, such as a toughened steel. It thus fulfils an electrical function, both by internal contact on the mating part and by contact of the contact tongues on the high-voltage module of the lamp. This flexible annulus 5 has a substantially circular shape; more precisely, it has a circular shape when the fixing system is in the locked position; it is circular by segments, or sectors, when the fixing system is in the unlocked position. In other words, the flexible annulus 5 has a greater tangential separation at one point than at another point, that is to say greater at the end of the segment than at the start of the segment.

This flexible annulus 5 comprises a plurality of tongues or claws, such as for example the holding tongues 51, whose role is to ensure the temporary axial holding between the rigid ring and the flexible annulus 5, and the fixing claws 52, which provide the locking of the lamp in the fixing system. These tongues provide the holding of the flexible lamp in the ring, in particular when the projecting sector 42 of the ring is fitted in one of the cavities of the flexible annulus. In the example of the ring in FIG. 3A, the holding tongues 51 also constitute the contact tongues of the fixing system, that is to say the tongues which provide the electrical continuity and the electromagnetic shielding between the high-voltage module and the mating part of the headlight.

According to the invention, this flexible annulus 5 comprises at least two fixing lugs 53 able to fit in attachment means of the mating part. These fixing lugs 53 are situated at the base of the ring 5, that is to say on the circumference of the ring opposite to the contact tongues 51. They each comprise at least one aperture 54, that is to say an orifice produced in the fixing lug, intended to attach to a harpoon of the mating part.

The end of each fixing lug 53 can comprise a bevel 55, at its free end, able to come into abutment against locking lugs of the rigid ring.

The flexible annulus 5 also comprises a clip 50 for positioning the annulus in the rigid ring. This clip 50 is a tongue bent at its free end in order to form a hook. This clip 50 provides angular positioning of the flexible annulus 5 with respect to the rigid ring, before the ring/annulus assembly is assembled on the mating part. Through a second cavity in the ring, the clip provides for the positioning of the annulus after locking of the lamp. As will be seen subsequently, this clip 50 is intended to be housed in a cavity in the rigid ring.

The flexible annulus 5 can be produced by cropping and forming in a metallic plate. This metallic plate can be a steel plate, treated after cropping and forming. Each claw, lug and other tongues are produced by cropping and bending. The circular shape of the annulus is obtained by forming the cropped plate. The cropped and formed plate is locked, in its circular form, by a fastener system 58. This fastener system 58 can comprise a hook 56 obtained by forming a tongue at one end of the metallic plate and an aperture 57 obtained by cropping in the other end of said metallic plate. The hook 56 is inserted in the aperture 57 in order to keep the ring closed. In order to provide locking of this fastener system, the aperture 57 can comprise two so-called "fir tree" spikes which guarantee a non-demountable connection.

FIG. 3B depicts an example of a flexible annulus for a D2 lamp. This flexible annulus 5 comprises, as explained before, holding tongues 51, contact tongues 59, fixing claws 52, fixing lugs 53 each with an aperture 54 and a bevel 55 and a positioning clip 50. In this example of the flexible ring, the contact tongues 59 are longer than the contact tongues 51 of the annulus for a D1 lamp, since they must provide electrical contact with the outside of the connector of the high-voltage module of the D2 lamp. On the other hand, in the case of the D1 lamp, the contact tongues provide electrical contact with a metallic zone situated under the connector of the D1 lamp. In this example of a flexible annulus, the holding tongues 51 are also longer than the holding tongues 51 of FIG. 3A since they also fulfill the role of contact tongues with the connector. They therefore have substantially the same form as the contact tongues 59 in their free end but are cropped and bent at their base so as to form a hook able to receive a sector projecting from the rigid ring and able to be inserted in a space in the bulb base of the D2 lamp.

As depicted in FIG. 4, whether it be provided for a D1 lamp or a D2 lamp, the flexible ring 5 is mounted in a rigid ring 4. This rigid ring is produced from a non-flexible material such as plastic or stainless steel. This rigid ring 4 comprises projecting sectors 42, or cams, at the top part of the ring 4, that is to say on the base of the ring situated close to the lamp. These projecting sectors are designed to fit in the hooks formed by the holding tongues 51 of the flexible annulus 5. The positioning of these projecting sectors 42 in the holding tongues 51 of the flexible annulus 5 provides the axial holding of the flexible annulus in the ring at the time of assembly.

The rigid ring 4 also comprises centering sectors 41 disposed on the internal ring of said ring and providing centering of the ring/annulus assembly of the lamp holder. These centering sectors 41 are situated in a zone of the internal wall of the ring which, after assembly with the flexible annulus, is covered by said annulus.

The rigid ring 4 also comprises at least one cavity 43 intended to receive the clip 50. This cavity 43 is formed in the thickness of the wall of the ring. It preferably has a V shape adapted to receive the hook of the positioning clip 50 of the flexible annulus 5. This clip, in position in the cavity 43 of the ring, provides the angular positioning of the annulus with respect to the ring on assembly. A second cavity can be present (not shown in the figures) in order to provide the positioning of the ring after locking of the lamp.

The rigid ring 4 also comprises locking lugs 44 which provide the locking of the ring on the lamp holder. These lugs 44 are situated at the base of the ring, that is to say on the bottom part of the wall of the ring, projecting from this wall. These lugs 44 each comprise a recess 45, that is to say a less protruding central zone, which allows the engagement of the ring 4 on the lamp holder, without interfering with the harpoons 24 of the lamp holder. These lugs 44 make it possible to orient the ring on the lamp holder. These lugs can be of different sizes and shapes, thus fulfilling a role of positive location device at the time of assembly on the lamp holder.

In the position with the lamp holder unlocked, the fixing lugs 53 of the flexible annulus are placed on of these locking lugs 44.

When the ring 4 and the flexible annulus 5 are assembled, thus forming a fixing system 3 for a D1 or D2 lamp, this assembly can be mounted on the lamp holder of the headlight.

Figure 5:
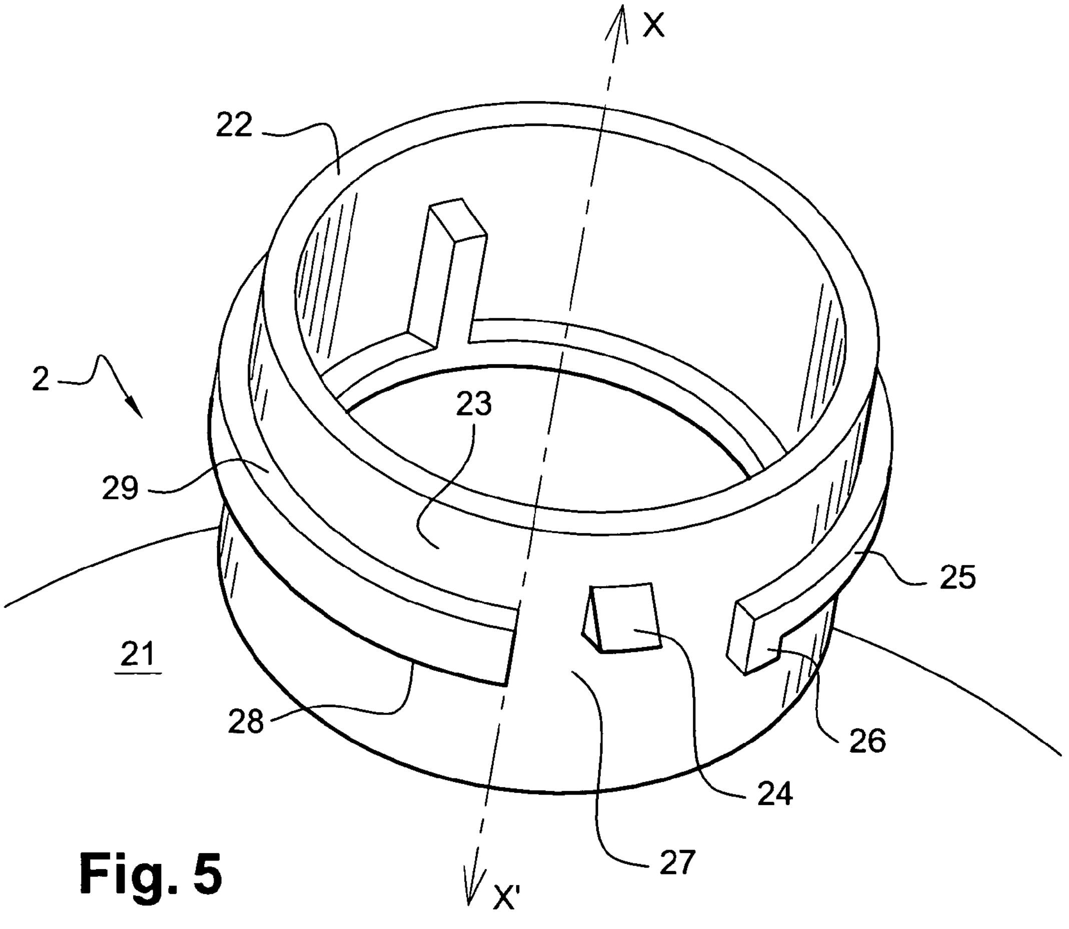
FIG. 5 depicts an example of a lamp holder on which a fixing system according to the invention is mounted.

An example of an mating part able to receive the fixing system 3 of the invention is shown in FIG. 5. This mating part 2 comprises a reflector 21 and a lamp holder 22. The mounting axis XX' of the ring 4 is shown. This lamp holder 22 has a cylindrical shape comprising an external surface 23 equipped with various protuberances intended to be inserted in the rigid ring 4 or the flexible annulus 5. More precisely, the lamp holder comprises, on its external surface 23, harpoons 24 able to fit into the apertures 54 of the fixing lugs 53 of the flexible annulus 5. These harpoons can be beveled with a part splayed downwards, that is to say towards the reflector, so that the connection between the annulus and the lamp holder cannot be dismantled by traction. These harpoons 24, associated with the fixing lugs 53 of the flexible annulus, thus provide the attachment of said annulus 5 to the mating part 2 and the mechanical strength of the annulus 5 under traction in the locking position.

The lamp holder 22 also comprises a circular projecting ridge 25, situated on the external contour of said lamp holder. The role of this projecting ridge 25 is to guide the movement of the locking lugs 44 of the ring 4. This ridge 25 preferably has a rectangular cross-section. The bottom face 28 of this projecting ridge provides resistance of the lugs to any traction in the direction X, when the ring is in the locked position. The top face 29 of this ridge limits the penetration of the lamp holder in the direction X', by means of the centering sectors 41 of the rigid ring 4.

The projecting ridge 25 comprises recesses 27 providing a passage for the locking lugs 44 of the ring 4. The harpoons 24 are situated in these recesses 27. It also comprises at least one stop 26, produced in its bottom face, limiting the movement of the locking lugs 44 of the ring 4.

Figure 6:
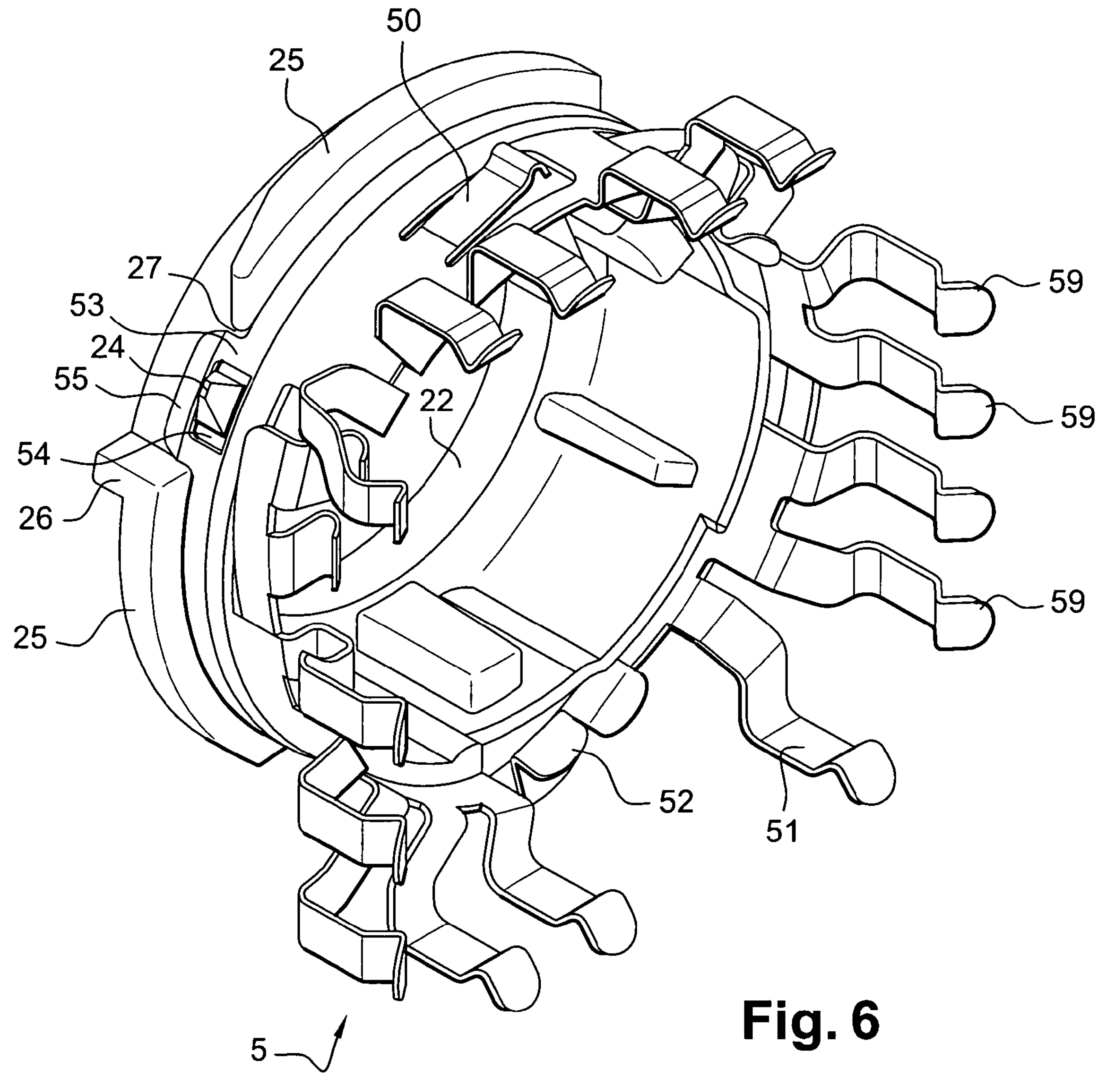
FIG. 6 depicts an example of a flexible annulus according to the invention mounted on a lamp holder.

FIG. 6 depicts the lamp holder 22 on which the flexible annulus 5 is mounted. It will be understood clearly that this figure is an explanatory view of the mounting of the annulus on the mating part and that this assembly does not need to take place in reality since the flexible annulus 5 is mounted in the ring 4 before being mounted on the lamp holder. This FIG. 6 shows a flexible annulus 5 for a D2 lamp, with its contact tongues 59, its holding tongues 51, its fixing claws 52 and its clip 50. This FIG. 6 also shows a lamp holder 22 with its ridge 25 and its harpoons 24. As can be seen in this figure, the harpoon 24 of the lamp holder 22 is inserted in the aperture 54 of the fixing lug 53 of the annulus 5. The annulus 5 is therefore fixed to the lamp holder 22 non-removably. Dismantling the assembly is made impossible provided that the ring 4 is in place around the annulus 5, making the harpoons 24 inaccessible to the user.

The fixing system 3 is assembled on the lamp holder 22 in the following fashion:

the fixing system is positioned on the lamp holder by placing the locking lugs 44 facing the recesses 27 in the ridge 25;

an axial pressure is applied to the metallic annulus: the recesses 45 of the lugs 44 enable the ring 4 to engage on the lamp holder 22 without attaching the harpoons 24; the fixing lugs 53 of the annulus deform to allow the insertion of the harpoons 24; once the tops of the harpoons have passed, the fixing lugs close again.

As will be understood from a reading of the above, the annulus is immobile with respect to the lamp holder. On the other hand, the rigid ring is able to move with respect to the flexible annulus 5 and consequently to the lamp holder 22. This ring 4 is free to rotate about the annulus 5 within the limits of a predefined angular value which is a function of the length of a segment containing fixing claws 52 and a holding lug 51 and the location of the cavity 43 on the rigid ring. When the fixing system is mounted on the lamp holder, only the rigid ring can be moved from a locked position to an unlocked position, and vice versa, to allow the replacement of the lamp in the headlight. The direction of locking is predetermined by the stop 26 of the lamp holder. To facilitate the movement of the rigid ring, by the user, the said ring can comprise gripping lugs 46 situated on the external face of the ring.

When the rigid ring is in the locked position, the lugs 44 of the ring are passed behind the projecting ridge 25 on the lamp holder. The ring can then resist all mechanical forces exerted on the lamp or connector. It is integral with the reflector.

What is claimed is:

1. A lighting and/or signaling apparatus for an automobile, comprising:

(a) a xenon lamp, comprising a bulb and a high voltage module which generates a high voltage pulsed output current for the bulb, the high voltage module being coupled to the bulb and having an exterior casing comprising an electrically conductive material;

(b) a mating part comprising (i) a reflector and (ii) a lamp holder which positions the bulb relative to the reflector, the lamp holder comprising at least one protuberance and (c) a fixing system for securing the xenon lamp to the mating part, comprising:

(i) a flexible annulus mounted to the lamp holder so as to be non-removable, the flexible annulus comprising: a) a plurality of connectors comprising an electrically conductive material which provide electrical continuity between the conductive casing of the high voltage module and a conductive zone of the mating part, and b) at least one fixing lug, wherein each fixing lug receives one protuberance when the flexible annulus is mounted to the lamp holder; and (ii) a rigid ring axially and rotatably movable relative to the flexible annulus and the lamp holder between an unlocked position and a locked position.

2. The apparatus according to claim 1, wherein each protuberance of the lamp holder is a harpoon intended each to fit in an aperture in a fixing lug of the flexible annulus.

3. The apparatus according to claim 1, wherein the rigid ring comprises locking lugs able to lock the movement of the rigid ring with respect to the lamp holder.

4. The apparatus according to claim 3, wherein the lamp holder comprises, on an external surface, a projecting ring guiding the movement of the locking lugs of the rigid ring.

5. The apparatus according to claim 3, wherein the lamp holder comprises, on an external surface, a projecting ring providing a stop for the rotation of the rigid ring about the mounting axis of the rigid ring.

6. The apparatus according to claim 3, wherein at least one fixing lug comprises a beveled free end, in particular masked before mounting behind the locking lugs of the rigid ring.

7. The apparatus according to claim 3, wherein the locking lugs comprise a recess having a depth and a width greater than a height and a width of the protuberance.

8. The apparatus according to claim 1, wherein the flexible annulus comprises at least one positioning clip and the rigid ring comprises at least one cavity for receiving a clip.

9. The apparatus according to claim 1, wherein the rigid ring is disposed around the flexible annulus so that, once the fixing system is mounted on the lamp holder, the fixing lugs of the flexible annulus are no longer accessible.

10. The apparatus according to claim 1, wherein the flexible annulus comprises fixing claws able to hold the xenon lamp in a locked position and the rigid ring comprises, on an internal face, cams able to push the fixing claws and hold them in the locked position.

11. The apparatus according to claim 1, wherein the flexible annulus comprises contact tongues providing electrical contact between the xenon lamp and the mating part.

12. The apparatus according to claim 1, wherein the flexible annulus comprises holding tongues and the rigid ring comprises projecting sectors configured to be received in the holding tongues, such that when the projecting sectors are positioned in the holding tongues the axial position of the flexible annulus is maintained relative to the rigid ring at the time of assembly.

13. The apparatus according to claim 1, wherein the flexible annulus is produced by cropping and bending a toughened steel plate.

14. The apparatus according to claim 13, wherein the flexible annulus comprises, at one end of the cropped plate, a hook and, at another end of the cropped plate, an aperture for receiving the hook.

* * * * *